Feb. 12, 1924.
G. G. HEGERMAN
CINEMATOGRAPH FILM
Filed May 27, 1922
1,483,581
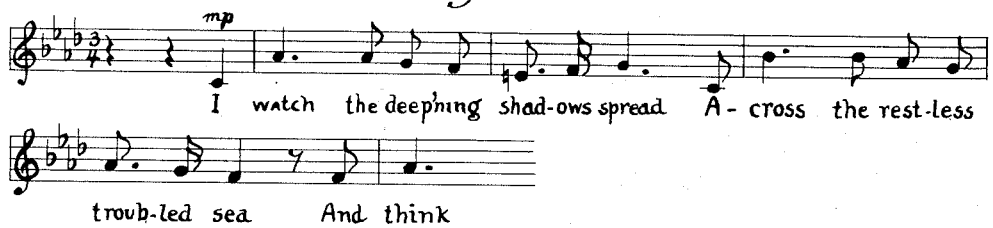
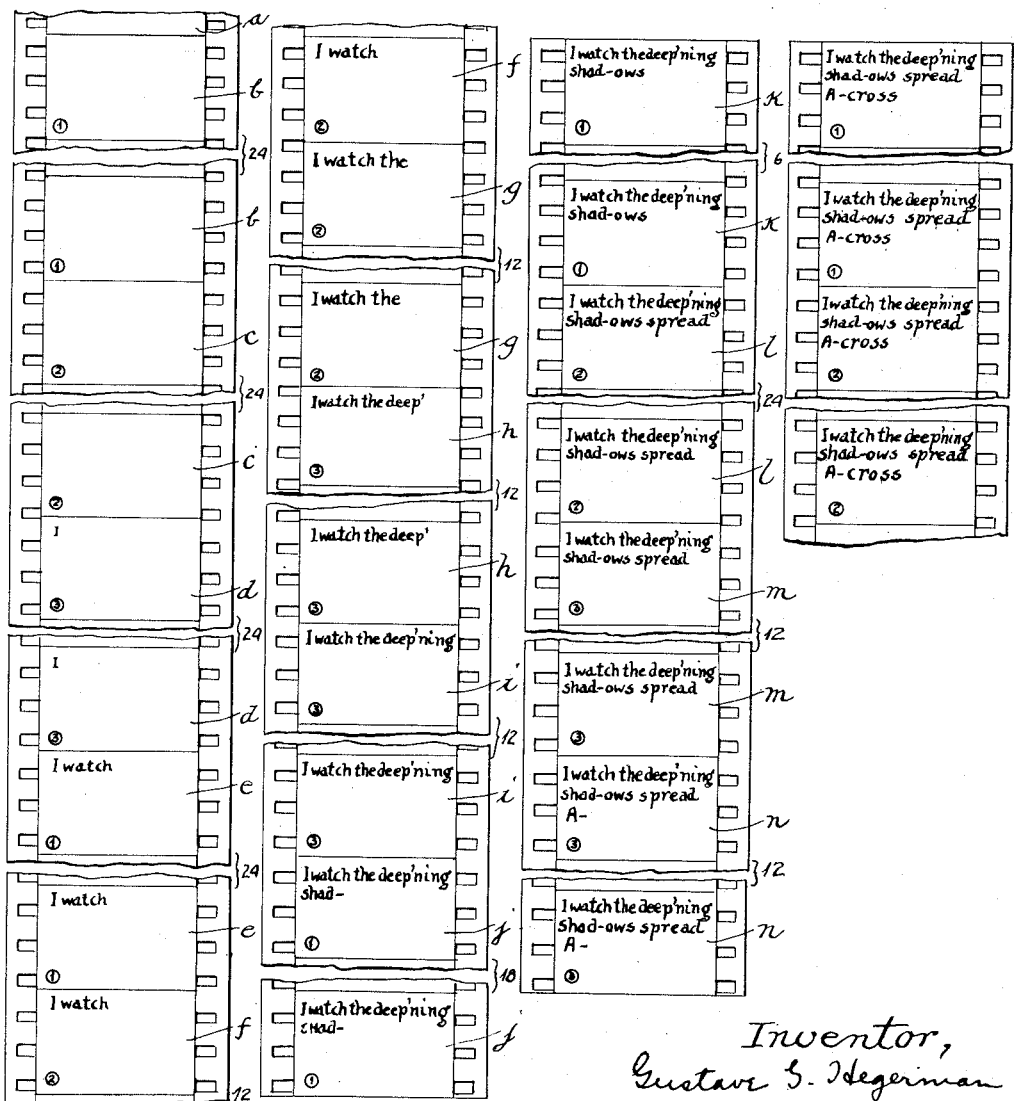

Patented Feb. 12, 1924.

1,483,581

UNITED STATES PATENT OFFICE.

GUSTAVE G. HEGERMAN, OF CHICAGO, ILLINOIS.

CINEMATOGRAPH FILM.

Application filed May 27, 1922. Serial No. 564,195.

*To all whom it may concern:*

Be it known that I, GUSTAVE G. HEGERMAN, a citizen of the United States, and a resident of Chicago, in the county of Cook and State of Illinois, have invented certain new and useful Improvements in Cinematograph Films, of which the following is a specification.

My invention relates to an improved cinematograph projecting process, and film for carrying out such process. My invention is of particular utility for facilitating community singing or singing by the audience in moving picture houses. By means of my invention audiences can readily and accurately follow an entirely new song on the screen and sing it in correct time and rhythm with the music accompaniment, and the musician or band leader is enabled to keep the music accurately in time with the projection of the song on the screen and the singing. In accordance with my improved process the words or syllables of the text of a song are projected progressively on the screen, that is, one at a time, until the entire song text eventually appears, and the sequence of the word or syllable projection is such that each word or syllable will appear in synchronism or rhythm with the particular note of the music to which such word or syllable is to be sung. Also, for the guidance of the musician or leader beat indications are projected on the screen in correspondence with the time factor of the music, these beat indications appearing at regular time intervals while the film is being run off, the film traveling at a uniform rate. With this improved process it is impossible for the audience to get ahead of or lag behind the music, and the music is always to the proper beat and time.

To enable a film to carry out my improved process its frames are divided into consecutive series in accordance with the notes to which the words of the song on the film are to be sung. The film travels at a uniform rate, and depending upon its rate a predetermined number of frames is allotted to a quarter note and a corresponding number of frames to each half note, eighth note, etc. and musical characters. For example if the speed at which a film is usually run off on the machine is such that twenty-four frames would be allotted to each quarter note in order to give the proper time to the music and song, forty-eight frames would be devoted to a half note, seventy-two to a three-quarter note and ninety-six to a full note. Where a song is written to three-quarter time there would by seventy-two frames to each measure or every three beats. If the song is written to four-four time then there would be ninety-six frames for each measure or every four beats. Instead of putting the notes on the film the words or syllables which are to be sung to the notes are placed on the film and thus the words will be projected on the screen in rhythm with the time of the song and the notes thereof.

In order to enable the music to be accurately played in correct tempo and rhythm with the appearance of the song words on the screen I place tempo or beat indications on the film at regular intervals and in synchronism with the song words. For example when the time of the song is three-quarters the numbers 1, 2 and 3 will alternately appear on the film at fixed intervals, twenty-four frames being allotted to each number as there are three beats to the measure and each measure takes seventy-two frames. The number 1 will appear on the film at the beginning of a measure simultaneously with the appearance of the first word of the measure if such word starts the measure. With this arrangement, the music can be kept in full rhythm with the words as they appear on the screen, and the audience, singing the words as they appear, must be in time and rhythm with the music, and there can be no lag or lead of the singing with reference to the music.

By reference to the illustrations on the accompanying drawings my improved process and film will be clearly understood. On the drawing Fig. 1 shows the first line of the first verse of a song set to music, and Fig. 2 shows the arrangement of the film for a part of the song.

On Fig. 1 I have shown merely two bars giving the notes for the air of the first line of the song, it being understood of course that there would be accompaniment notes associated with these air notes.

The song is written to three-quarter time so that there would be three beats to each measure. To demonstrate my invention twenty-four film frames are allotted to each quarter note, this number of frames for quarter notes giving about the correct time or tempo with the rate at which films are usually run off. In the first measure the note for the song word "I" is a quarter note and would require twenty-four film frames. In the second measure the first note over the word "watched" is a quarter note requiring twenty-four frames, and this note is followed by a musical character in the form of a prolongation dot which will prolong the quarter note one-eighth and will therefore require twelve frames so that the note plus the character requires thirty-six frames. The second, third and fourth note of the second measure are each a one-eighth note and each requires twelve frames. In the third measure the first note over the syllable "shad" is an eighth note followed by a one-sixteenth prolongation dot, the combination requiring therefore eighteen frames. The second note over the syllable "ows" is a sixteenth note and requires six frames. The third note is a quarter note followed by a one-eighth prolongation, the combination requiring thirty-six frames. The fourth note is an eighth note and requires twelve frames. Thus each note, depending upon its value, is allotted a definite number of frames on the film.

Referring now to Fig. 2 I show the arrangement on the film to correspond with the note arrangement but, to save space, the frames intervening between the first and last of each series are omitted. The film usually has a number of frames $a$ devoted to the introduction to the song or other matter. Following the introduction there would be twenty-four frames $b$ for the first beat of the first measure of the song air, and then twenty-four frames $c$ for the second beat of this measure. These beat indications or numbers are preferably placed in the lower left hand corners of the frames and it may be advisable to so project the film on the screen that these beat indications will be visible only to the musician or band leader.

The next twenty-four frames $d$ will have on the beat indications 3 and also the opening word "I" of the song which is to be sung to the quarter note appearing in the first measure. Following the frame series $d$ is the series $e$ containing twenty-four frames for the first or quarter note of the second measure, and these frames in addition to the word "I" have the second word "watch," and the beat indication 1 appears on each of these frames.

The next series $f$ contains twelve frames for the dot following the first note of the second measure which dot has a time value equivalent to a one-eighth note. The series $f$ has also the beat indication 2 thereon. The twelve frames of the next series $g$ also have on the beat indication 2 and have added thereto the word "the" below the second or one-eighth note of the second measure. The next series $h$ and $i$ have the beat indication 3 thereon, the series $h$ adding the syllable "deep" and the series $i$ adding the syllable "ning," each of these syllables being sung to an eighth note. The next series $j$ shows the beat indication 1 and adds the syllable "shad," this series having eighteen frames to cover the combination of the first or one-eighth note of the third measure and its accompanying dot. The next series $k$ has six frames for the second or one-sixteenth note of the third measure and the frames of this series have on the beat indication 1 and add the syllable "ows" which is to be sung to the one-sixteenth note. The film thus proceeds, the beat indication changing every twenty-four frames and the words or syllables of the song appearing on the corresponding frame series. As the film is run off at a uniform rate of travel the time intervals between beat indications will be alike, but the words will appear on the screen at the proper time in correspondence with the music. The audience sings the words or syllables as they appear, and the music follows the beat indications which appear on the screen in synchronism with the words, so that the music and singing must at all times be in full accord and rhythm. For a song written in two-four time the series of beat indications 1 and 2 would be repeated on the screen, and with a song written to four-four time the beat series 1, 2, 3, 4 would be repeated. To each quarter note there would be allotted a number of frames depending upon the tempo or time of the song.

With the arrangement shown each word or syllable, after it appears, remains on the screen until the entire text of the song is finally built up on the screen. It is evident that the arrangement could be such that each word or syllable would remain on the screen only long enough to be sung. This would leave space on the screen for the projection of moving pictures, scenery or other matter. A film could be devoted partly to singing and partly to acting, dancing or other entertainment of which the song might form a part. For example, a film may be partly devoted to a song and partly to dancing to the music of which the song forms a part. With such arrangement it would be advisable to have the beat indications appear on the screen during the dancing so that the singing, when again taken up, would be in rhythm with the dancing.

I thus produce a process for projecting song text which will enable the singing of a song, particularly when it is new, with greater accuracy, rhythm and enjoyment than is possible with the methods heretofore resorted to. I do not desire to be limited to the exact procedure and arrangement shown and referred to as changes and modifications could be made which will still come within the scope of the invention.

I claim as follows:

1. A cinematograph film having words or syllables of a song text applied thereto progressively to succeeding series of its frames until the entire text appears, the number of frames in each series depending upon the quality of the note to which the respective word or syllable is to be sung, so that the words or syllables will appear on the screen in synchronism with the playing of the respective music notes when the screen is run off at a uniform rate.

2. A cinematograph film having the words or syllables of a song text applied thereto progressively and to succeeding series of its frames, the number of frames in each series depending upon the quality of the note to which the respective word or syllable is to be sung, so that the words or syllables will appear on the screen in synchronism with the frames of the respective music notes when the film is run off at a uniform rate, said film also bearing legends at regular intervals indicative on the screen of the beat corresponding with the time of the music and the words on the screen.

In witness whereof, I hereunto subscribe my name this 23rd day of May, A. D. 1922.

GUSTAVE G. HEGERMAN.